(No Model.)
C. LEPAGE.
HAND TRUCK.
No. 529,738. Patented Nov. 27, 1894.
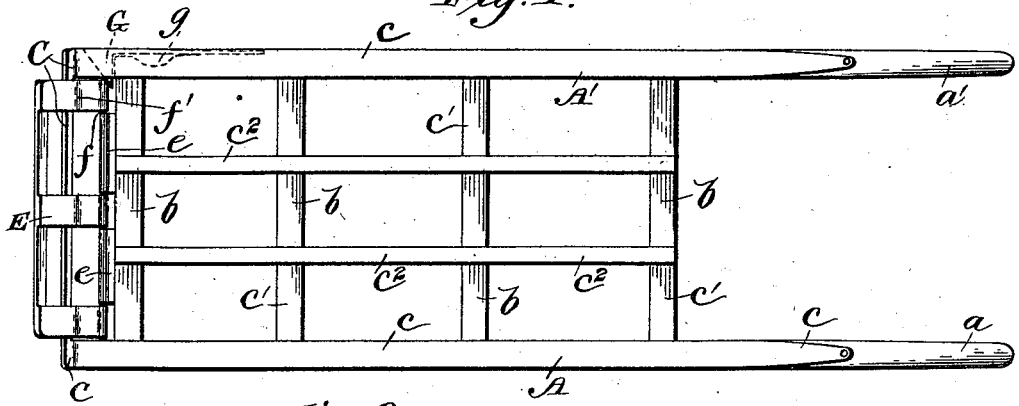
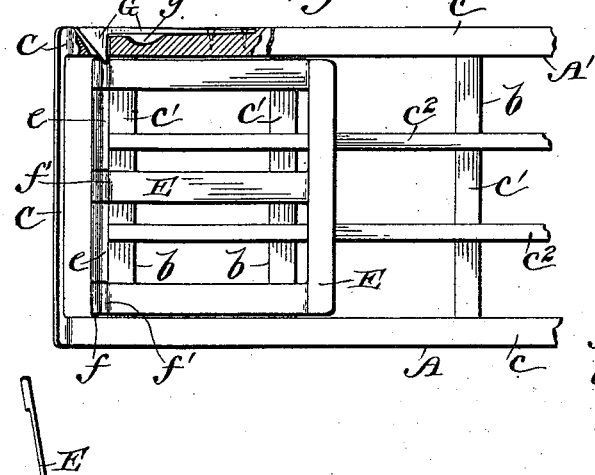
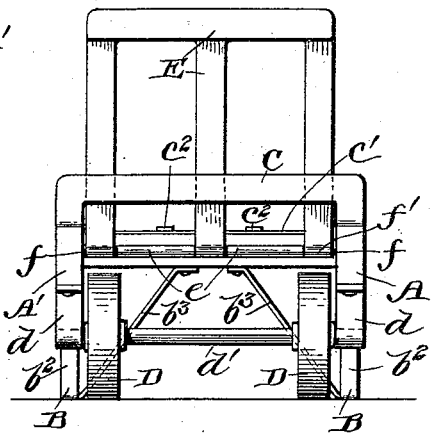
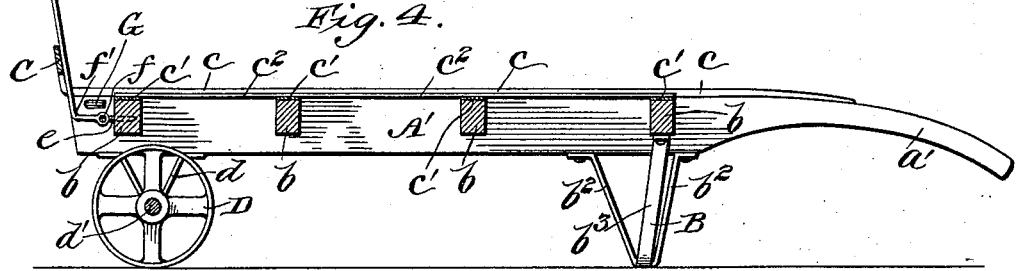
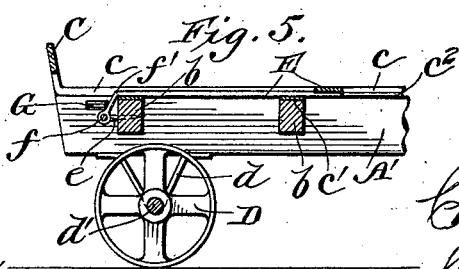
Witnesses
Severance
W. Harvey Muzzy
Inventor
Charles Lepage
by
Mason Fenwick Lawrence
Attorneys
THE NORRIS PETERS CO., PHOTO-LITHO., WASHINGTON, D. C.

UNITED STATES PATENT OFFICE.

CHARLES LEPAGE, OF DULUTH, MINNESOTA, ASSIGNOR OF ONE-HALF TO CHARLES BLAIS, OF SUPERIOR, WISCONSIN.

HAND-TRUCK.

SPECIFICATION forming part of Letters Patent No. 529,738, dated November 27, 1894.

Application filed April 5, 1894. Serial No. 506,396. (No model.)

*To all whom it may concern:*

Be it known that I, CHARLES LEPAGE, a citizen of the United States, residing at Duluth, in the county of St. Louis and State of Minnesota, have invented certain new and useful Improvements in Hand-Trucks; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in trucks and the objects of my invention are, first, to provide a truck with an improved adjustable apron capable of being raised into operative position at will; second, to provide means for securing said apron flat upon the truck out of the way of the ordinary nose of the truck when so desired; third, to form and hinge said apron to said truck so that it will when in use throw the weight of the article being carried forward of the truck wheels, and fourth, to so form the supporting legs of the truck that they will present a smooth bearing surface to the floor or pavement when being dragged over the same. I attain these objects by the devices described in the following specification and illustrated in the accompanying drawings, in which latter—

Figure 1. represents a top plan view of the truck embodying my invention with the apron in an upright position. Fig. 2. represents a top plan view of the forward part of the truck, the same being broken away to expose the spring catch for retaining the apron in position when lowered on the truck. Fig. 3. represents an end elevation of the said truck with the apron in its raised position. Fig. 4. represents a central, vertical, longitudinal section through said truck with the apron raised, and also showing the foot and brace constructed of a single piece of metal; and, Fig. 5. represents a central vertical section of the forward part of the truck with the apron in its lowered position.

A and A' in the drawings represent the two side beams of the truck which are formed at their rear ends into handles $a, a'$. These side beams are connected and held at the desired distance apart by cross beams $b$ preferably four in number. The upper surfaces of said side and cross beams are covered or protected with sheet iron strips $c, c'$, the strip $c$ which covers the two side beams being formed in one piece which is bent upward at the forward end of said side beams to form the truck toe C which prevents articles placed on the truck from slipping therefrom. Other strips $c^2$ are placed across the cross beams so as to form a crate like bottom for the truck so that small articles will be prevented from falling through the same. The top surfaces of the side beams are slightly higher than those of the cross beams, so that the auxiliary apron E, which is made only as wide as the space between the side beams, will, when lowered, lie flush with the top surfaces of the side beams.

The truck supporting legs B are struck from one piece of metal and each consists of the leg proper $b^2$ and a lateral brace $b^3$ integral therewith. The legs proper are secured by bolts to the side beams just forward of the handles $a, a'$ and the braces $b^3$ are secured in the same manner to the cross beam $b$ which is nearest to said handles. The legs and braces therefor by being formed integral present a smooth lower surface to rest upon the ground and will not tear the planking or runway when it is necessary to rest them on the same to act as a brake when the truck is in motion, as would be the case if the legs and braces were fastened together with a rivet which extended through the under side of the foot and formed a projecting rough surface.

The truck wheels D are mounted in the ordinary manner by hangers $d$ on the under side of the side beams but are so placed that the axle $d'$ comes slightly in the rear of the forward cross beam. A cross rod $f$ is mounted with its ends in the side beams and slightly in front of said forward cross beam. This rod serves as a pivot upon which the angular apron E is hinged. The rod is held rigid by braces $e$ which pass about the same and are secured in said forward cross beam. The apron as before stated is formed at its lower end with an angle as at $f'$ so that when thrown over into its lowered position on the truck it will neatly fit over the edge of the forward cross beam as shown at Fig. 5, and permit the main portion of the apron to fold on the truck with its upper surface flush with the top of the same and thus not interfere with the operation of the truck when it is desired to use the ordinary stationary toe piece alone. The auxiliary apron is preferably constructed as shown, of three vertical bars, an upper cross bar and a middle cross bar; the vertical bars being pivoted at their lower ends to the rod f, and the apron, when in a raised position, supported along its whole width, by the nose of the truck. To hold the said apron in its lowered position on the truck I provide a spring catch G which is attached to the outside of one of the side beams and has a beveled shaped head which is adapted to work transversely through an aperture in said side beam so as to project beyond the inner surface thereof and engage the angular portion of the apron and thereby hold it in its lowered position on said truck. To release the catch from said apron, said catch is pulled backward by grasping it at a finger recess g formed for that purpose in the side of the cross beam and behind the said catch. When the apron is in its raised position and the load on the truck is resting against it, the tendency will be to elevate the rear end of the truck as the pivotal point of said apron is forward of the truck wheels, and the person handling the truck will be thus relieved of the weight of the load. The apron when thrown down on the truck is automatically locked by the spring catch which is pressed outward by reason of the apron striking its beveled end, the catch returning to its normal position by the action of the said spring.

It will be observed that when the apron is in its raised position it rests against the stationary toe and the hinges of said apron are thus relieved of a greater part of the strain which would otherwise fall upon them.

My adjustable apron can be applied to any ordinary truck without the necessity of its being altered at all and this is a very great advantage as most trucks having aprons must be specially constructed.

It will be observed that by constructing the truck with a considerable open space between the stationary nose and the forward cross beam, and forming the apron with an angular horizontal extension, and pivoting the apron at several points to a rod located below the upper surface of the truck forward of the wheels and in rear of the stationary nose, and by slightly depressing the surfaces of the cross beams below the upper surfaces of the side beams, that the weight of a load will be thrown forward of the wheels and much of the weight of the load removed from the operator of the truck; also that a pivotal support from one side beam of the truck to the other is obtained by means of which the apron can be secured at several points along its length as shown in the drawings; also that when the apron is raised a support extending the width of the truck is provided for the apron, thereby greatly removing the strain of the load from off the hinges or pivots of the apron, and also that the apron is adapted to be lowered perfectly flush with the side beams of the truck.

What I claim as my invention is—

1. In a wheeled hand truck, the combination of a body portion formed at its rear end with handles and provided at its forward end with stationary nose, and having an open space between the nose and the forward cross beam of the truck, a rod secured at the forward end of the truck and below its top surface, forward of the wheels and in rear of the said nose, an auxiliary apron formed with an angular horizontal extension and pivoted to the said rod, and a right angular shaped spring catch having a beveled nose, one end of the catch being secured to one of the side beams of the truck, and its beveled end passed through a transverse passage formed therein and extending slightly outside of the inner face of the said side beam, whereby the apron is adapted to be automatically locked when lowered and to be automatically released in the act of raising the same, substantially as described.

2. In a wheeled hand truck, the combination of a body portion formed at its rear end with handles and at its forward end with a stationary nose, and having an open space between the nose and the forward cross beam of the truck, a rod secured at the forward end of the truck below its top surface and in rear of the said nose and extending entirely across the truck, an auxiliary apron formed of vertical bars and horizontal cross bars, and having an angular horizontal extension and pivoted to the said rod at several points along its length, and a right angular shaped spring catch having a beveled nose, being secured by one of its ends to one of the side beams of the truck while its beveled end passes through a transverse passage formed in said beam and extends slightly outward beyond the inner face of the same, whereby the apron is adapted to be automatically locked when lowered and to be automatically released in the act of raising the same, substantially as described.

In testimony whereof I hereunto affix my signature in presence of two witnesses.

CHARLES LEPAGE.

Witnesses:
JAMES T. WATSON,
VAN R. BROWN.